United States Patent
Edwards et al.

[15] 3,649,104
[45] Mar. 14, 1972

[54] FOUR COMPONENT OBJECTIVE

[72] Inventors: Garry Edwards; Walter Mandler; Erich Wagner, all of Midland, Ontario, Canada

[73] Assignee: Ernst Leitz GmbH, Wetzlar, Germany

[22] Filed: July 30, 1970

[21] Appl. No.: 59,544

[30] Foreign Application Priority Data

Aug. 1, 1969 Germany .......................P 19 39 099.9

[52] U.S. Cl. ............................................................350/223
[51] Int. Cl. ............................................................G02b 9/56
[58] Field of Search .................................................350/223

[56] References Cited

UNITED STATES PATENTS 2,449,769  9/1948  Cox .......................................350/223

FOREIGN PATENTS OR APPLICATIONS 186,917  3/1923  Great Britain ..........................350/223
245,820  3/1966  Austria ...................................350/223

*Primary Examiner*—John K. Corbin
*Attorney*—Krafft & Wells

[57] ABSTRACT

A four component objective for picture taking and projection comprises convex front surfaces on the first, second, and fourth component lenses in the direction of light travel. The refractive power $\phi_{11}$ of the first surface of the first lens ranges between 1.5 and 2.0 while the refractive power $\phi_{21}$ of the first surface of the second lens and $\phi_{22}$ of the second surface of the second lens range from 1.4 to 2.4 and from −2.0 to −1.0 respectively. The refractive power $\phi_{32}$ of the second surface of the third lens lies between −3.7 and −2.5.

19 Claims, 2 Drawing Figures

Patented March 14, 1972  3,649,104

GARRY EDWARDS
WALTER MANDLER
ERICH WAGNER
        INVENTORS

BY Krafft + Wells

FOUR COMPONENT OBJECTIVE

BACKGROUND OF THE INVENTION

The present invention relates to photographic and/or projection objectives consisting of four single lenses.

There are already numerous four component objectives known in the art, particularly those wherein the third lens is a diverging lens while the remaining three lenses are collecting lenses (here and in the following the lenses are numbered on the assumption that of a picture taking objective the first lens faces the object, while of a projection objective the first lens faces the screen).

Particularly well known is a type of objective — to which also the objectives according to the invention belong — wherein the first refracting surfaces of the first, second, and fourth lenses are convex and wherein the spacing of the third lens from the fourth is greater than the spacing from the second lens. It has already been undertaken to improve upon the imaging quality of such objectives by introducing cemented surfaces of short radius of curvature.

According to another suggestion the first refractive surface of the first lens has to have a radius of curvature which is longer than 55 percent of the focal length of the objective. Additionally, the thickness of the second lens is to be greater than 12 percent of the focal length, while the third lens must consist of a glass having an index of refraction $n$ greater than 1.68 and an Abbe number $v$ smaller than 33. Objectives of this type have good imaging qualities throughout an angular field of up to 40° as, for example, disclosed in the U.S. Pat. No. 2,170,428 issued on Aug. 22, 1939 to Robert Richter of Jena/Germany, and in the corresponding German Pat. No. 724,605 which, however, discloses one embodiment in excess of the U.S. Pat. disclosure.

All known four component objectives have in common, however, that their state of correction, particularly with regard to the correction of the spherical zone, to the astigmatic zone and to the coma of higher order, is markedly inferior to the state of correction which can be achieved with objectives of the so-called Gauss-type.

SUMMARY OF THE INVENTION

Surprisingly it has now been discovered that it is possible to achieve an improvement of the above mentioned imaging errors in four component lenses which renders such objectives equivalent in imaging quality to the Gauss-type objectives. According to the invention this result is achieved by providing four surfaces out of the eight existing surfaces with an extremely high refractive power.

The introduction of surfaces of high refractive power is contrary to all previous experience since up to now the assumption prevailed that the imaging errors caused by surfaces of high refractive power cannot be corrected. Objectives according to the invention, however, are characterized by the combination of the following data:

$$1.5 \leq \phi_{11} \leq 2.0$$
$$1.4 \leq \phi_{21} \leq 2.4$$
$$-2.0 \leq \phi_{22} \leq -1.0$$
$$-3.7 \leq \phi_{32} \leq -2.5$$

wherein $\phi$ represents the refractive power of the surface and the index associated with $\phi$ indicates in its first digit the number of the lens and in its second digit the surface of this particular lens, wherein the lens and surface are both numbered in the direction of light travel. $\phi_{11}$, therefore, stands for the refractive power of the front surface of lens 1.

This principle of design may be employed throughout wide ranges of focal lengths with all resulting objectives having relatively large apertures.

BRIEF DESCRIPTION OF THE DRAWINGS

In the accompanying drawings.

DESCRIPTION OF THE PREFERRED EMBODIMENTS

Figure 1:
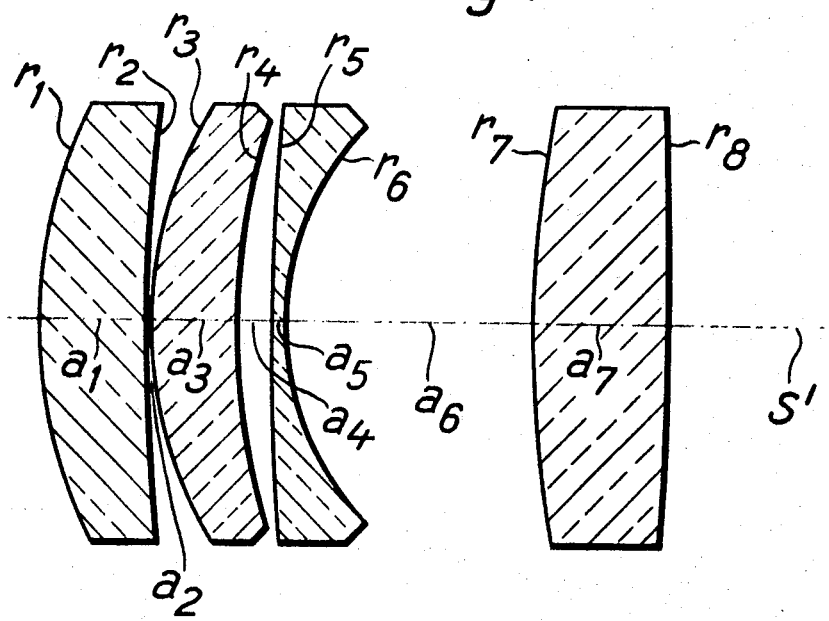
FIG. 1 shows a sectional view of an objective according to the invention as disclosed hereinafter in Example 1.
Figure 2:
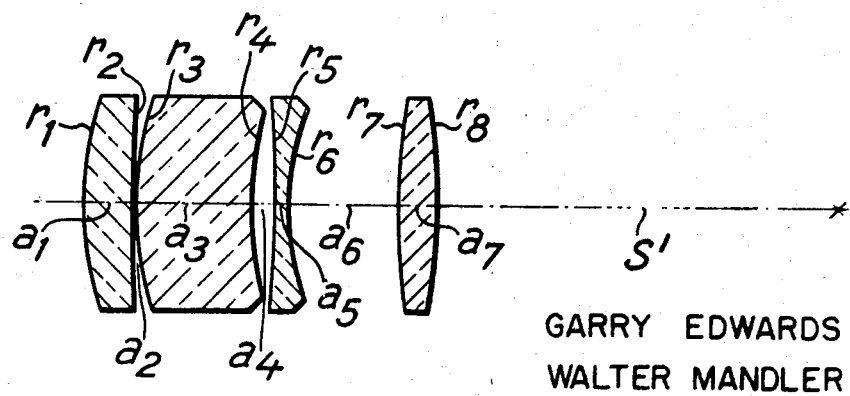
FIG. 2 shows a sectional view of an embodiment as disclosed in Example 19.

In the following tables the data of seven preferred embodiments of the invented type of objectives are listed. The state of correction of these objectives shows a remarkable improvement over the state of correction of comparable prior art objectives.

In the tables, $r_1$ through $r_8$ represent the radii of the various surfaces, while $a_1$ through $a_7$ stand for the axial thicknesses and spacings of the lenses. $n_e$ and $v_e$ designate the refractive index and the Abbe number respectively of the lens glasses. $\phi_u$ indicates the refractive power of several lens surfaces.

EXAMPLE 1

Relative aperture $f:2$
field angle 45°

| | | $n_e$ | $v_e$ | $\phi_u$ |
|---|---|---|---|---|
| $r_1=41.155$ | | | | 1.791 |
| | $a_1=9.6282$ | 1.7369 | 51.4 | |
| $r_2=153.450$ | | | | |
| | $a_2=0.1926$ | | | |
| $r_3=35.861$ | | | | 2.055 |
| | $a_3=8.0936$ | 1.7369 | 51.4 | |
| $r_4=57.796$ | | | | −1.275 |
| | $a_4=3.0779$ | | | |
| $r_5=172.479$ | | | | |
| | $a_5=1.1554$ | 1.7686 | 26.3 | |
| $r_6=24.533$ | | | | |
| | $a_6=22.4142$ | | | −3.133 |
| $r_7=98.823$ | | | | |
| | $a_7=12.0489$ | 1.7546 | 34.7 | |
| $r_8=-372.074$ | | | | |
| $s'=49.4781$ | | | | | wherein $s'$ is the back focal distance.

EXAMPLE 2 relative aperture $f:2$
field angle 45°

| | | $n_e$ | $v_e$ | $\phi_u$ |
|---|---|---|---|---|
| $r_1=37.848$ | | | | 1.834 |
| | $a_1=10.5614$ | 1.6940 | 54.48 | |
| $r_2=172.102$ | | | | |
| | $a_2=0.1920$ | | | |
| $r_3=31.350$ | | | | 2.148 |
| | $a_3=6.1458$ | 1.6734 | 46.82 | |
| $r_4=50.887$ | | | | −1.323 |
| | $a_4=2.9764$ | | | |
| $r_5=161.342$ | | | | |
| | $a_5=1.5362$ | 1.7471 | 27.38 | |
| $r_6=22.680$ | | | | |
| | $a_6=22.0830$ | | | −3.294 |
| $r_7=89.041$ | | | | |
| | $a_7=17.2824$ | 1.7546 | 34.72 | |
| $r_8=-1,069.902$ | | | | |
| $s'=45.9771$ | | | | |

EXAMPLE 3 relative aperture $f:2$
field angle 45°

| | | $n_e$ | $v_e$ | $\phi_u$ |
|---|---|---|---|---|
| $r_1=37.8820$ | | | | 1.832 |
| | $a_1=10.3776$ | 1.6940 | 54.5 | |
| $r_2=190.3362$ | | | | |
| | $a_2=0.1922$ | | | |
| $r_3=32.1397$ | | | | 2.095 |
| | $a_3=5.9575$ | 1.6734 | 46.8 | |
| $r_4=49.9450$ | | | | −1.348 |
| | $a_4=3.2670$ | | | |
| $r_5=200.4813$ | | | | |
| | $a_5=1.5374$ | 1.7471 | 27.4 | |
| $r_6=23.4264$ | | | | |
| | $a_6=21.9082$ | | | −3.189 |
| $r_7=95.2488$ | | | | |
| | $a_7=11.5306$ | 1.7546 | 34.7 | |
| $r_8=-424.3870$ | | | | |
| $s'=50.5074$ | | | | |

EXAMPLE 4 relative aperture $f:2.5$ field angle 27°

$r_1 = 44.661$
$r_2 = 907.494$
$r_3 = 44.217$
$r_4 = 53.141$
$r_5 = -283.639$
$r_6 = 28.296$
$r_7 = 106.334$
$r_8 = -77.780$

| | $n_e$ | $v_e$ | $\phi_{II}$ |
|---|---|---|---|
| $a_1 = 6.4232$ | 1.6808 | 54.93 | 1.524 |
| $a_2 = 0.1107$ | | | |
| $a_3 = 14.3968$ | 1.6413 | 55.15 | 1.450 |
| $a_4 = 2.2149$ | | | -1.207 |
| $a_5 = 1.9602$ | 1.7343 | 28.19 | -2.595 |
| $a_6 = 25.3272$ | | | |
| $a_7 = 4.9835$ | 1.6413 | 55.15 | |
| $s' = 58.6533$ | | | |

EXAMPLE 5 relative aperture f:2.5
field angle 27°

$r_1 = 37.423$
$r_2 = 248.983$
$r_3 = 35.273$
$r_4 = 45.552$
$r_5 = 326.449$
$r_6 = 24.099$
$r_7 = 95.187$
$r_8 = -165.060$

| | $n_e$ | $v_e$ | $\phi_{II}$ |
|---|---|---|---|
| $a_1 = 6.6664$ | 1.6940 | 54.48 | 1.854 |
| $a_2 = 0.1111$ | | | |
| $a_3 = 8.9676$ | 1.7206 | 47.69 | 2.043 |
| $a_4 = 2.2221$ | | | -1.581 |
| $a_5 = 1.6666$ | 1.7617 | 27.37 | -3.161 |
| $a_6 = 23.3945$ | | | |
| $a_7 = 4.4443$ | 1.6713 | 41.64 | |
| $s' = 56.4679$ | | | |

EXAMPLE 6 relative aperture f:2.5
field angle 27°

$r_1 = 42.003$
$r_2 = 555.241$
$r_3 = 41.393$
$r_4 = 53.898$
$r_5 = -518.724$
$r_6 = 27.059$
$r_7 = 101.535$
$r_8 = -101.535$

| | $n_e$ | $v_e$ | $\phi_{II}$ |
|---|---|---|---|
| $a_1 = 6.9191$ | 1.6808 | 54.93 | 1.620 |
| $a_2 = 0.1111$ | | | |
| $a_3 = 13.1941$ | 1.6413 | 55.15 | 1.549 |
| $a_4 = 2.2212$ | | | -1.190 |
| $a_5 = 1.9658$ | 1.7617 | 27.37 | -2.815 |
| $a_6 = 23.4466$ | | | |
| $a_7 = 5.7641$ | 1.6734 | 46.82 | |
| $s' = 55.9258$ | | | |

EXAMPLE 7 relative aperture f:2.5
field angle 27°

$r_1 = 44.661$
$r_2 = 907.494$
$r_3 = 44.217$
$r_4 = 53.141$
$r_5 = -283.639$
$r_6 = 28.296$
$r_7 = 106.334$
$r_8 = -77.780$

| | $n_e$ | $v_e$ | $\phi_{II}$ |
|---|---|---|---|
| $a_1 = 6.4232$ | 1.6808 | 54.9 | 1.524 |
| $a_2 = 0.1107$ | | | |
| $a_3 = 14.3968$ | 1.6413 | 55.2 | 1.450 |
| $a_4 = 2.2149$ | | | -1.207 |
| $a_5 = 1.9602$ | 1.7343 | 28.2 | -2.595 |
| $a_6 = 25.3272$ | | | |
| $a_7 = 4.9835$ | 1.6413 | 55.2 | |
| $s' = 58.6533$ | | | |

In the embodiments of which the data are given in the following tables a remarkable improvement over the triplet prior art long focal distance objectives is achieved by following the same principle of design. The costs of manufacture of the invented objectives remain inside the same amounts as are required for the known triplets, owing to the employment of most inexpensive glasses. In addition, the overall length of the invented objectives is shorter by about 15 percent as compared to the triplets.

EXAMPLE 8 relative aperture f:2.5
field angle 20.5°

$r_1 = 35.9214$
$r_2 = 381.6318$
$r_3 = 30.8445$
$r_4 = 59.1201$
$r_5 = 229.2469$
$r_6 = 20.3292$
$r_7 = 62.8734$
$r_8 = -226.7839$

| | $n_e$ | $v_e$ | $\phi_{II}$ |
|---|---|---|---|
| $a_1 = 7.0802$ | 1.6413 | 55.2 | 1.785 |
| $a_2 = 0.0833$ | | | |
| $a_3 = 8.3296$ | 1.6734 | 46.8 | 2.183 |
| $a_4 = 2.3168$ | | | -1.139 |
| $a_5 = 2.0824$ | 1.7471 | 27.4 | -3.675 |
| $a_6 = 37.2798$ | | | |
| $a_7 = 7.4966$ | 1.7044 | 29.8 | |
| $s' = 36.1438$ | | | |

EXAMPLE 9 relative aperture f:2.8
field angle 16.5°

$r_1 = 32.1200$
$r_2 = 638.5319$
$r_3 = 28.6428$
$r_4 = 43.1469$
$r_5 = 668.6314$
$r_6 = 20.5977$
$r_7 = 72.5975$
$r_8 = -1,526.3602$

| | $n_e$ | $v_e$ | $\phi_{II}$ |
|---|---|---|---|
| $a_1 = 10.6662$ | 1.6251 | 52.9 | 1.946 |
| $a_2 = 0.0670$ | | | |
| $a_3 = 5.3629$ | 1.6734 | 46.8 | 2.351 |
| $a_4 = 2.3535$ | | | -1.561 |
| $a_5 = 2.0111$ | 1.7471 | 27.4 | -3.627 |
| $a_6 = 26.3783$ | | | |
| $a_7 = 6.7037$ | 1.7044 | 29.8 | |
| $s' = 50.6831$ | | | |

EXAMPLE 10 relative aperture f:4.3
field angle 14°

$r_1 = 40.384$
$r_2 = -510.033$
$r_3 = 38.367$
$r_4 = 41.767$
$r_5 = -116.219$
$r_6 = 27.442$
$r_7 = 138.645$
$r_8 = -69.455$

| | $n_e$ | $v_e$ | $\phi_{II}$ |
|---|---|---|---|
| $a_1 = 6.7204$ | 1.6675 | 50.59 | 1.653 |
| $a_2 = 0.1400$ | | | |
| $a_3 = 12.8808$ | 1.6466 | 55.15 | 1.685 |
| $a_4 = 2.1561$ | | | -1.548 |
| $a_5 = 1.9041$ | 1.7747 | 27.37 | -2.823 |
| $a_6 = 22.8493$ | | | |
| $a_7 = 5.6003$ | 1.6800 | 46.82 | |
| $s' = 78.2068$ | | | |

EXAMPLE 11 relative aperture f:3.4
field angle 12°

$r_1 = 32.090$
$r_2 = 229.126$
$r_3 = 32.540$
$r_4 = 34.542$
$r_5 = -203.589$
$r_6 = 23.829$
$r_7 = 60.386$

| | $n_e$ | $v_e$ | $\phi_{II}$ |
|---|---|---|---|
| $a_1 = 4.5168$ | 1.5187 | 63.96 | 1.616 |
| $a_2 = 0.1004$ | | | |
| $a_3 = 12.5588$ | 1.5187 | 63.96 | 1.594 |
| $a_4 = 2.0075$ | | | -1.501 |
| $a_5 = 1.3789$ | 1.6942 | 30.95 | -2.913 |
| $a_6 = 12.6369$ | | | |

$r_8 = -65.945$
$s' = 70.5338$

EXAMPLE 12 relative aperture $f:2.5$
field angle $12°$

| | | $n_e$ | $v_e$ |
|---|---|---|---|
| $r_1 = 38.691$ | | | |
| | $a_1 = 6.4859$ | 1.5914 | 61.03 |
| $r_2 = 545.363$ | | | |
| | $a_2 = 0.0997$ | | |
| $r_3 = 37.364$ | | | |
| | $a_3 = 16.1502$ | 1.5712 | 55.85 |
| $r_4 = 52.491$ | | | |
| | $a_4 = 2.4946$ | | |
| $r_5 = -299.255$ | | | |
| | $a_5 = 1.4959$ | 1.7686 | 26.31 |
| $r_6 = 24.237$ | | | |
| | $a_6 = 19.7906$ | | |
| $r_7 = 73.234$ | | | |
| | $a_7 = 2.9917$ | 1.6241 | 36.11 |
| $r_8 = -92.756$ | | | |
| | $s' = 54.1134$ | | |

EXAMPLE 13 relative aperture $f:4$
field angle $10°$

| | | $n_e$ | $v_e$ |
|---|---|---|---|
| $r_1 = 28.184$ | | | |
| | $a_1 = 4.5147$ | 1.5187 | 63.96 |
| $r_2 = 303.966$ | | | |
| | $a_2 = 0.1003$ | | |
| $r_3 = 25.878$ | | | |
| | $a_3 = 9.2791$ | 1.5187 | 63.96 |
| $r_4 = 28.204$ | | | |
| | $a_4 = 2.0065$ | | |
| $r_5 = -517.357$ | | | |
| | $a_5 = 1.5049$ | 1.6942 | 30.95 |
| $r_6 = 20.302$ | | | |
| | $a_6 = 12.3708$ | | |
| $r_7 = 55.620$ | | | |
| | $a_7 = 3.0098$ | 1.5854 | 41.80 |
| $r_8 = -96.007$ | | | |
| | $s' = 68.4689$ | | |

EXAMPLE 14 relative aperture $f:2.8$
field angle $10°$

| | | $n_e$ | $v_e$ |
|---|---|---|---|
| $r_1 = 32.779$ | | | |
| | $a_1 = 6.9878$ | 1.5187 | 63.96 |
| $r_2 = \infty$ | | | |
| | $a_2 = 0.0998$ | | |
| $r_3 = 31.057$ | | | |
| | $a_3 = 12.4429$ | 1.5187 | 63.96 |
| $r_4 = 46.253$ | | | |
| | $a_4 = 1.9965$ | | |
| $r_5 = -248.654$ | | | |
| | $a_5 = 1.4974$ | 1.6942 | 30.95 |
| $r_6 = 21.283$ | | | |
| | $a_6 = 22.9799$ | | |
| $r_7 = 62.076$ | | | |
| | $a_7 = 2.9948$ | 1.5854 | 41.80 |
| $r_8 = -127.799$ | | | |
| | $s' = 55.3021$ | | |

EXAMPLE 15 relative aperture $f:2.8$
field angle $10°$

| | | $n_e$ | $v_e$ |
|---|---|---|---|
| $r_1 = 31.5893$ | | | |
| | $a_1 = 6.9863$ | 1.5187 | 64.0 |
| $r_2 = \infty$ | | | |
| | $a_2 = 0.0998$ | | |
| $r_3 = 31.8141$ | | | |
| | $a_3 = 11.5300$ | 1.5187 | 64.0 |
| $r_4 = 43.2309$ | | | |
| | $a_4 = 2.3954$ | | |
| $r_5 = -156.3477$ | | | |
| | $a_5 = 1.4971$ | 1.6942 | 31.0 |
| $r_6 = 21.9650$ | | | |
| | $a_6 = 18.9835$ | | |
| $r_7 = 67.0252$ | | | |
| | $a_7 = 2.9941$ | 1.5854 | 41.8 |
| $r_8 = -91.6156$ | | | |
| | $s' = 59.5668$ | | |

EXAMPLE 16 relative aperture $f:2.8$
field angle $8°$

| | $\phi_{II}$ |
|---|---|
| $r_1 = 33.172$ | |
| | 1.529 |
| $r_2 = \infty$ | |
| $r_3 = 31.231$ | |
| | 1.529 |
| $r_4 = 49.937$ | |
| | /1.088 |
| $r_5 = -277.429$ | |
| $r_6 = 21.146$ | |
| | /3.171 |
| $r_7 = 60.094$ | |
| $r_8 = -150.093$ | |

EXAMPLE 17 relative aperture $f:4.3$
field angle $8°$

| | $\phi_{II}$ |
|---|---|
| $r_1 = 30.695$ | 1.840 |
| $r_2 = 290.142$ | |
| $r_3 = 30.545$ | 2.004 |
| $r_4 = 31.148$ | /1.839 |
| $r_5 = -143.227$ | |
| $r_6 = 23.894$ | /3.419 |
| $r_7 = 61.005$ | |
| $r_8 = -60.101$ | |

EXAMPLE 18 relative aperture $f:4.0$
field angle $7°$

| | $\phi_{II}$ |
|---|---|
| $r_1 = 28.203$ | 1.582 |
| $r_2 = \infty$ | |
| $r_3 = 25.901$ | 1.670 |
| $r_4 = 28.244$ | /1.121 |
| $r_5 = -516.980$ | |
| $r_6 = 20.313$ | /3.262 |
| $r_7 = 55.572$ | |
| $a_7 = 3.0117$ | |
| $r_8 = -96.291$ | |

EXAMPLE 19 relative aperture $f:4.0$
field angle $6°$

| | $\phi_{II}$ |
|---|---|
| $r_1 = 30.050$ | 1.642 |
| $r_2 = 363.927$ | |
| $r_3 = 30.452$ | 1.630 |
| $r_4 = 31.892$ | /1.200 |
| $r_5 = -141.468$ | |
| $r_6 = 24.043$ | /3.160 |
| $r_7 = 68.038$ | |
| $r_8 = -61.405$ | |

EXAMPLE 16

| | $n_e$ | $v_e$ | $\phi_{II}$ |
|---|---|---|---|
| $a_1 = 7.0071$ | 1.5187 | 63.96 | 1.564 |
| $a_2 = 0.1001$ | | | |
| $a_3 = 12.6516$ | 1.5187 | 63.96 | 1.661 |
| $a_4 = 2.0020$ | | | /1.039 |
| $a_5 = 1.5015$ | 1.6942 | 30.95 | |
| $a_6 = 24.9799$ | | | /3.283 |
| $a_7 = 3.0031$ | 1.5854 | 41.80 | |
| $s' = 53.3337$ | | | |

EXAMPLE 17

| | $n_e$ | $v_e$ | $\phi_{II}$ |
|---|---|---|---|
| $a_1 = 4.4969$ | | | 1.689 |
| $a_2 = 0.0999$ | 1.5187 | 63.96 | |
| $a_3 = 11.4393$ | 1.5187 | 63.96 | 1.698 |
| $a_4 = 1.9986$ | | | /1.665 |
| $a_5 = 1.4990$ | 1.7044 | 29.84 | |
| $a_6 = 9.7600$ | | | /2.948 |
| $a_7 = 2.9980$ | 1.5854 | 41.80 | |
| $s' = 68.5721$ | | | |

EXAMPLE 18

| | $n_e$ | $v_e$ | $\phi_{II}$ |
|---|---|---|---|
| $a_1 = 4.5176$ | 1.5187 | 63.96 | 1.839 |
| $a_2 = 0.1004$ | | | |
| $a_3 = 9.2850$ | 1.5187 | 63.96 | 2.003 |
| $a_4 = 2.0078$ | | | /1.837 |
| $a_5 = 1.5059$ | 1.6942 | 30.95 | |
| $a_6 = 12.3787$ | | | /3.417 |
| | 1.5854 | 41.80 | |
| $s' = 70.2337$ | | | |

EXAMPLE 19

| | $n_e$ | $v_e$ | $\phi_{II}$ |
|---|---|---|---|
| $a_1 = 4.5022$ | 1.5187 | 63.96 | 1.726 |
| $a_2 = 0.1000$ | | | |
| $a_3 = 10.3508$ | 1.5187 | 63.96 | 1.703 |
| $a_4 = 2.0010$ | | | /1.626 |
| $a_5 = 1.3744$ | 1.6942 | 30.95 | |
| $a_6 = 10.1405$ | | | /2.887 |
| $a_7 = 3.0015$ | 1.5854 | 41.80 | |
| $s' = 69.5493$ | | | |

What is claimed is:

1. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ wherein $\phi$ denotes the refractive power and the index associated with $\phi$ indicates in its first digit the number of the lens in the direction of light travel and its second digit refers to the lens surface also in the direction of light travel, the objective having substantially the following data:

| relative aperture | f:2 | | | |
|---|---|---|---|---|
| field angle | 45° | | | |
| | | $n_e$ | $v_e$ | $\phi_{ii}$ |
| $r_1=41.155$ | | | | 1.791 |
| | $a_1=9.6282$ | 1.7369 | 51.4 | |
| $r_2=153.450$ | | | | |
| | $a_2=0.1926$ | | | |
| $r_3=35.861$ | | | | 2.055 |
| | $a_3=8.0936$ | 1.7369 | 51.4 | |
| $r_4=57.796$ | | | | −1.275 |
| | $a_4=3.0779$ | | | |
| $r_5=172.479$ | | | | |
| | $a_5=1.1554$ | 1.7686 | 26.3 | |
| $r_6=24.533$ | | | | −3.133 |
| | $a_6=22.4142$ | | | |
| $r_7=98.823$ | | | | |
| | $a_7=12.0489$ | 1.7546 | 34.7 | |
| $r_8=-372.074$ | | | | |
| | $s'=49.4781$ | | | | wherein $s'$ is the back focal distance, $n_3$ is the refractive index, $v_3$ is the Abbe number, $r_1 - r_8$ are the radii of the surfaces, $a_1 - a_7$ are the axial thicknesses and $\phi_{ii}$ indicates the refractive power of several lens surfaces.

2. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ wherein $\phi$ denotes the refractive power and the index associated with $\phi$ idnicates in its first digit the number of the lens in the direction of light travel and its second digit refers to the lens surface also in the direction of light travel, the objective having substantially the following data:

| relative aperture | f:2 | | | |
|---|---|---|---|---|
| field angle | 45° | | | |
| | | $n_e$ | $v_e$ | $\phi_{ii}$ |
| $r_1=37.848$ | | | | 1.834 |
| | $a_1=10.5614$ | 1.6940 | 54.48 | |
| $r_2=172.102$ | | | | |
| | $a_2=0.1920$ | | | |
| $r_3=31.350$ | | | | 2.148 |
| | $a_3=6.1458$ | 1.6734 | 46.82 | |
| $r_4=50.887$ | | | | −1.323 |
| | $a_4=2.9764$ | | | |
| $r_5=161.342$ | | | | |
| | $a_5=1.5362$ | 1.7471 | 27.38 | |
| $r_6=22.680$ | | | | −3.294 |
| | $a_6=22.0830$ | | | |
| $r_7=89.041$ | | | | |
| | $a_7=17.2824$ | 1.7546 | 34.72 | |
| $r_8=-1069.902$ | | | | |
| | $s'=45.9771$ | | | | wherein $s'$ is the back focal distance, $r_1-r_8$ are the radii of the surfaces, $a_1-a_7$ are the axial thicknesses and $\phi_{ii}$ indicates the refractive power of several lens surfaces.

3. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ where $\phi$ denotes the refractive power nand the index associated with $\phi$ indicates in its first digit the number of the lens in the direction of light travel and its second digi refers to the lens surface also in the direction of light travel, the objective having substantially the following data:

| relative aperture | f:2 | | | |
|---|---|---|---|---|
| field angle | 45° | | | |
| | | $n_e$ | $v_e$ | $\phi_{ii}$ |
| $r_1=37.8820$ | | | | 1.832 |
| | $a_1=10.3776$ | 1.6940 | 54.5 | |
| $r_2=190.3362$ | | | | |
| | $a_2=0.1922$ | | | |
| $r_3=32.1397$ | | | | 2.095 |
| | $a_3=5.9575$ | 1.6734 | 46.8 | |
| $r_4=49.9450$ | | | | −1.348 |
| | $a_4=3.2670$ | | | |
| $r_5=200.4813$ | | | | |
| | $a_5=1.5374$ | 1.7471 | 27.4 | |
| $r_6=23.4264$ | | | | −3.189 |
| | $a_6=21.9082$ | | | |
| $r_7=95.2488$ | | | | |
| | $a_7=11.5306$ | 1.7546 | 34.7 | |
| $r_8=-424.3870$ | | | | |
| | $s'=50.5074$ | | | | wherein $s'$ is the back focal distance, $r_1 - r_8$ are the radii of the surfaces, $a_1 - a_7$ are the axial thicknesses and $\phi_{ii}$ indicates the refractive power of several lens surfaces.

4. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ wherein $\phi$ denotes the refractive power and the index associated with $\phi$ indicates in its first digit the number of the lens in the direction of light travel and its second digit refers to the lens surface also in the direction of light travel, the objective having substantially the following data:

| relative aperture | f:2.5 | | | |
|---|---|---|---|---|
| field angle | 27° | | | |
| | | $n_e$ | $v_e$ | $\phi_{ii}$ |
| $r_1=44.661$ | | | | 1.524 |
| | $a_1=6.4232$ | 1.6808 | 54.93 | |
| $r_2=907.494$ | | | | |
| | $a_2=0.1107$ | | | |
| $r_3=44.217$ | | | | 1.450 |
| | $a_3=14.3968$ | 1.6413 | 55.15 | |
| $r_4=53.141$ | | | | −1.207 |
| | $a_4=2.2149$ | | | |
| $r_5=-283.639$ | | | | |
| | $a_5=1.9602$ | 1.7343 | 28.19 | |
| $r_6=28.296$ | | | | −2.595 |
| | $a_6=25.3272$ | | | |
| $r_7=106.334$ | | | | |
| | $a_7=4.9835$ | 1.6413 | 55.15 | |
| $r_8=77.780$ | | | | |
| | $s'=58.6533$ | | | | wherein $s'$ is the back focal distance, $r_1 - r_8$ are the radii of the surfaces, $a_1 - a_7$ are the axial thicknesses and $\phi_{ii}$ indicates the refractive power of several lens surfaces.

5. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ wherein $\phi$ denotes the refractive powers and the index associated with $\phi$ indicates in its first digit the number of the lens in the direction of light travel and its second digit refers to the lens surface also in the direction of light travel, the objective having substantially the following data:

| relative aperture | f:2.5 | | | |
|---|---|---|---|---|
| field angle | 27° | | | |
| | | $n_e$ | $v_e$ | $\phi_{ii}$ |
| $r_1=37.423$ | | | | 1.854 |
| | $a_1=6.6664$ | 1.6940 | 54.48 | |
| $r_2=248.983$ | | | | |
| | $a_2=0.1111$ | | | |
| $r_3=35.273$ | | | | 2.043 |
| | $a_3=8.9676$ | 1.7206 | 47.69 | |
| $r_4=45.552$ | | | | -1.581 |
| | $a_4=2.2221$ | | | |
| $r_5=326.449$ | | | | |
| | $a_5=1.6666$ | 1.7617 | 27.37 | |
| $r_6=24.099$ | | | | -3.161 |
| | $a_6=23.3945$ | | | |
| $r_7=95.187$ | | | | |
| | $a_7=4.4443$ | 1.6713 | 41.64 | |
| $r_8=-165.060$ | | | | |
| | $s'=56.4679$ | | | | wherein $s'$ is the back focal distance, $r_1 - r_8$ are the radii of the surfaces, $a_1 - a_7$ are the axial thicknesses and $\phi_{ii}$ indicates the refractive power of several lens surfaces.

6. Four component objective for picture taking an projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ wherein $\phi$ denotes the refractive power and the index associated with $\phi$ indicates in its first digit the number of the lens in the direction of light travel and its second digit refers to the lens surface also in the direction of light travel, the objective having substantially the following data:

| relative aperture | f:2.5 | | | |
|---|---|---|---|---|
| field angle | 27° | | | |
| | | $n_e$ | $v_e$ | $\phi_{ii}$ |
| $r_1=44.661$ | | | | 1.524 |
| | $a_1=6.4232$ | 1.6808 | 54.9 | |
| $r_2=907.494$ | | | | |
| | $a_2=0.1107$ | | | |
| $r_3=44.217$ | | | | 1.450 |
| | $a_3=14.3968$ | 1.6413 | 55.2 | |
| $r_4=53.141$ | | | | -1.207 |
| | $a_4=2.2149$ | | | |
| $r_5=-283.639$ | | | | |
| | $a_5=1.9602$ | 1.7343 | 28.2 | |
| $r_6=28.296$ | | | | -2.595 |
| | $a_6=25.3272$ | | | |
| $r_7=106.334$ | | | | |
| | $a_7=4.9835$ | 1.6413 | 55.2 | |
| $r_8=-77.780$ | | | | |
| | $s'=58.6533$ | | | | wherein $s'$ is the back focal distance, $r_1 - r_8$ are the radii of the surfaces, $a_1 - a_7$ are the axial thicknesses and $\phi_{ii}$ indicates the refractive power of several lens surfaces.

7. Four component objective for picture taking and projection comprising four lenses of which the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ wherein $\phi$ denotes the refractive power and the index associated with $\phi$ indicates in its first digit the number of the lens in the direction of light travel and its second digit refers to the lens surface also in the direction of light travel, the objective having substantially the following data:

| relative aperture | f:2.8 | | | |
|---|---|---|---|---|
| field angle | 16.5° | | | |
| | | $n_e$ | $v_e$ | $\phi_{ii}$ |
| $r_1=32.1200$ | | | | 1.946 |
| | $a_1=10.6662$ | 1.6251 | 52.9 | |
| $r_2=638.5319$ | | | | |
| | $a_2=0.0670$ | | | |
| $r_3=28.6428$ | | | | 2.351 |
| | $a_3=5.3629$ | 1.6734 | 46.8 | |
| $r_4=43.1469$ | | | | -1.561 |
| | $a_4=2.3535$ | | | |
| $r_5=668.6314$ | | | | |
| | $a_5=2.0111$ | 1.7471 | 27.4 | |
| $r_6=20.5977$ | | | | -3.627 |
| $r_7=72.5975$ | | | | |
| | $a_6=6.7037$ | 1.7044 | 29.8 | |
| $r_8=-1526.3602$ | | | | |
| | $s'=50.6831$ | | | | wherein $s'$ is the back focal distance $r_1 - r_8$ are the radii of the surfaces, $a_1 - a_7$ are the axial thicknesses and $\phi_{ii}$ indicates the refractive power of several lens surfaces.

8. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ wherein $\phi$ denotes the refractive power and the index associated with $\phi$ indicates in its first digit the number of the lens in the direction of light travel and its second digit refers to the lens surface also in the direction of light travel, the objective having substantially the following data:

| relative aperture | f:4.3 | | | |
|---|---|---|---|---|
| field angle | 14° | | | |
| | | $n_e$ | $v_e$ | $\phi_{ii}$ |
| $r_1=40.384$ | | | | 1.653 |
| | $a_1=6.7204$ | 1.6675 | 50.59 | |
| $r_2=-510.033$ | | | | |
| | $a_2=0.1400$ | | | |
| $r_3=38.367$ | | | | 1.685 |
| | $a_3=12.8808$ | 1.6466 | 55.15 | |
| $r_4=41.767$ | | | | -1.548 |
| | $a_4=2.1561$ | | | |
| $r_5=-116.219$ | | | | |
| | $a_5=1.9041$ | 1.7747 | 27.37 | |
| $r_6=27.442$ | | | | -2.823 |
| | $a_6=22.8493$ | | | |
| $r_7=138.645$ | | | | |
| | $a_7=5.6003$ | 1.6800 | 46.82 | |
| $r_8=-69.455$ | | | | |
| | $s'=78.2068$ | | | | wherein $s'$ is the back focal distance, $r_1$-$r_8$ are the radii of the surfaces, $a_1$-$a_7$ are the axial thicknesses and $\phi_{ii}$ indicates the refractive power of several lens surfaces.

9. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ wherein $\phi$ denotes the refractive power and the index associated with $\phi$ indicates in its first digit the number of the lens in the direction of light travel and its second digit refers to the lens surface also in the direction of light travel, the objective having substantially the following data:

| relative aperture | f:2.5 | | | |
|---|---|---|---|---|
| field angle | 12° | | | |
| | | $n_e$ | $v_e$ | $\phi_{ii}$ |
| $r_1=38.691$ | | | | 1.529 |
| | $a_1=6.4859$ | 1.5914 | 61.03 | |
| $r_2=545.365$ | | | | |
| | $a_2=0.0997$ | | | |
| $r_3=37.364$ | | | | 1.529 |
| | $a_3=16.1502$ | 1.5712 | 55.85 | |
| $r_4=52.491$ | | | | -1.088 |
| | $a_4=2.4946$ | | | |
| $r_5=-299.255$ | | | | |
| | $a_5=1.4959$ | 1.7686 | 26.31 | |
| $r_6=24.237$ | | | | -3.171 |
| | $a_6=19.7906$ | | | |
| $r_7=73.234$ | | | | |
| | $a_7=2.9917$ | 1.6241 | 36.11 | |
| $r_8=-92.756$ | | | | |
| $s'=54.1134$ | | | | | wherein $s'$ is the back focal distance, $r_1$–$r_8$ are the radii of the surfaces, $a_1$–$a_7$ are the axial thicknesses and $\phi_{ii}$ indicates the refractive power of several lens surfaces.

10. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ wherein $\phi$ denotes the refractive power and the index associated with $\phi$ indicates in its first digit the number of the lens in the direction of light travel and its second digit refers to the lens surface also in the direction of light travel, the objective having substantially the following data:

| relative aperture | f:4 | | | |
|---|---|---|---|---|
| field angle | 10° | | | |
| | | $n_e$ | $v_e$ | $\phi_{ii}$ |
| $r_1=28.184$ | | | | 1.840 |
| | $a_1=4.5147$ | 1.5187 | 63.96 | |
| $r_2=303.966$ | | | | |
| | $a_2=0.1003$ | | | |
| $r_3=25.878$ | | | | 2.004 |
| | $a_3=9.2791$ | 1.5187 | 63.96 | |
| $r_4=28.204$ | | | | -1.839 |
| | $a_4=2.0065$ | | | |
| $r_5=-517.357$ | | | | |
| | $a_5=1.5049$ | 1.6942 | 30.95 | |
| $r_6=20.302$ | | | | -3.419 |
| | $a_6=12.3708$ | | | |
| $r_7=55.620$ | | | | |
| | $a_7=3.0098$ | 1.5854 | 41.80 | |
| $r_8=-96.007$ | | | | |
| $s'=68.4689$ | | | | | wherein $s'$ is the back focal distance, $r_1$–$r_8$ are the radii of the surfaces, $a_1$–$a_7$ are the axial thicknesses and $\phi_{ii}$ indicates the refractive power of several lens surfaces.

11. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ wherein $\phi$ denotes the refractive power and the index associated with $\phi$ indicates in its first digit the number of the lens in the direction of light travel and its second digit refers to the lens surface also in the direction of light travel, the objective having substantially the following data:

| relative aperture | f:2.8 | | | |
|---|---|---|---|---|
| field angle | 10° | | | |
| | | $n_e$ | $v_e$ | $\phi_{ii}$ |
| $r_1=32.779$ | | | | 1.582 |
| | $a_1=6.9878$ | 1.5187 | 63.96 | |
| $r_2=\infty$ | | | | |
| | $a_2=0.0998$ | | | |
| $r_3=31.057$ | | | | 1.670 |
| | $a_3=12.4429$ | 1.5187 | 63.96 | |
| $r_4=46.253$ | | | | -1.121 |
| | $a_4=1.9965$ | | | |
| $r_5=-248.654$ | | | | |
| | $a_5=1.4974$ | 1.6942 | 30.95 | |
| $r_6=21.283$ | | | | -3.262 |
| | $a_6=22.9799$ | | | |
| $r_7=62.076$ | | | | |
| | $a_7=2.9948$ | 1.5854 | 41.80 | |
| $r_8=-127.799$ | | | | |
| $s'=55.3021$ | | | | | wherein $s'$ is the back focal distance, $r_1$–$r_8$ are the radii of the surfaces, $a_1$–$a_7$ are the axial thicknesses and $\phi_{ii}$ indicates the refractive power of several lens surfaces.

12. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ wherein $\phi$ denotes the refractive power and the index associated with $\phi$ indicates in its first digit the number of the lens in the direction of light travel and its second digit refers to the lens surface also in the direction of light travel, the objective having substantially the following data:

| relative aperture | f:2.8 | | | |
|---|---|---|---|---|
| field angle | 10° | | | |
| | | $n_e$ | $v_e$ | $\phi_{ii}$ |
| $r_1=31.5893$ | | | | 1.642 |
| | $a_1=6.9863$ | 1.5187 | 64.0 | |
| $r_2=\infty$ | | | | |
| | $a_2=0.0998$ | | | |
| $r_3=31.8141$ | | | | 1.630 |
| | $a_3=11.5300$ | 1.5187 | 64.0 | |
| $r_4=43.2309$ | | | | -1.200 |
| | $a_4=2.3954$ | | | |
| $r_5=-156.3477$ | | | | |
| | $a_5=1.4971$ | 1.6942 | 31.0 | |
| $r_6=21.9650$ | | | | -3.160 |
| | $a_6=18.9835$ | | | |
| $r_7=67.0252$ | | | | |
| | $a_7=2.9941$ | 1.5854 | 41.8 | |
| $r_8=-91.6156$ | | | | |
| $s'=59.5668$ | | | | | wherein $s'$ is the focal distance, $r_1$–$r_8$ are the radii of the surfaces, $a_1$–$a_7$ are the axial thicknesses and $\phi_{ii}$ indicates the refractive power of several lens surfaces.

13. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ wherein $\phi$ denotes the refractive power and the index associated with $\phi$ indicates in its first digit the number of the lens in the direction of light travel and its second digit refers to the lens surface also in the direction of light travel, the objective having substantially the following data:

| relative aperture | $f$:2.8 | | | |
|---|---|---|---|---|
| field angle | 8° | | | |
| | | $n_e$ | $v_e$ | $\phi_{ii}$ |
| $r_1$=33.172 | | | | 1.564 |
| | $a_1$=7.0071 | 1.5187 | 63.96 | |
| $r_2$=∞ | | | | |
| | $a_2$=0.1001 | | | |
| $r_3$=31.231 | | | | 1.661 |
| | $a_3$=12.6516 | 1.5187 | 63.96 | |
| $r_4$=49.937 | | | | −1.039 |
| | $a_4$=2.0020 | | | |
| $r_5$=−277.429 | | | | |
| | $a_5$=1.5015 | 1.6942 | 30.95 | |
| $r_6$=21.146 | | | | −3.283 |
| | $a_6$=24.9799 | | | |
| $r_7$=60.094 | | | | |
| | $a_7$=3.0031 | 1.5854 | 41.80 | |
| $r_8$=−150.093 | | | | |
| | $s'$=53.3337 | | | | wherein $s'$ is the back focal distance, $r_1$–$r_8$ are the radii of the surfaces, $a_1$–$a_7$ are the axial thicknesses and $\phi_{ii}$ indicates the refractive power of several lens surfaces.

14. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $$1.5 \leq \phi_{11} \leq 2.0$$
$$1.4 \leq \phi_{21} \leq 2.4$$
$$-2.0 \leq \phi_{22} \leq -1.0$$
$$-3.7 \leq \phi_{22} \leq -2.5$$

wherein $\phi$ denotes the refractive power and the index associated with $\phi$ indicates in its first digit the number of the lens in the direction of light travel and its second digit refers to the lens surface also in the direction of light travel, the objective having substantially the following data:

| relative aperture | $f$:4.3 | | | |
|---|---|---|---|---|
| field angle | 8° | $n_e$ | $v_e$ | $\phi_{ii}$ |
| $r_1$=30.695 | | | | 1.689 |
| | $a_1$=4.4969 | 1.5187 | 63.96 | |
| $r_2$=290.142 | | | | |
| | $a_2$=0.0999 | | | |
| $r_3$=30.545 | | | | 1.698 |
| | $a_3$=11.4393 | 1.5187 | 63.96 | |
| $r_4$=31.148 | | | | −1.665 |
| | $a_4$=1.9986 | | | |
| $r_5$=−143.227 | | | | |
| | $a_5$=1.4990 | 1.7044 | 29.84 | |
| $r_6$=23.894 | | | | −2.948 |
| | $a_6$=9.7600 | | | |
| $r_7$=61.005 | | | | |
| | $a_7$=2.9980 | 1.5854 | 41.80 | |
| $r_8$=−60.101 | | | | |
| | $s'$=68.5721 | | | | wherein $s'$ is the back focal distance, $r_1$–$r_8$ are the radii of the surfaces, $a_1$–$a_7$ are the axial thicknesses and $\phi_{ii}$ indicates the refractive power of several lens surfaces.

15. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table $$1.5 \leq \phi_{11} \leq 2.0$$
$$1.4 \leq \phi_{21} \leq 2.4$$
$$-2.0 \leq \phi_{22} \leq -1.0$$
$$-3.7 \leq \phi_{32} \leq -2.5$$

wherein $\phi$ denotes the refractive power and the index associated with $\phi$ indicates in its first digit the number of the lens in the direction of light travel and its second digit refers to the lens surface also in the direction of light travel, the objective having substantially the following data:

| relative aperture | $f$:4.0 | | | |
|---|---|---|---|---|
| field angle | 7° | | | |
| | | $n_e$ | $v_e$ | $\phi_{ii}$ |
| $r_1$=28.203 | | | | 1.839 |
| | $a_1$=4.5176 | 1.5187 | 63.96 | |
| $r_2$=305.001 | | | | |
| | $a_2$=0.1004 | | | |
| $r_3$=25.901 | | | | 2.003 |
| | $a_3$=9.2850 | 1.5187 | 63.96 | |
| $r_4$=28.244 | | | | −1.837 |
| | $a_4$=2.0078 | | | |
| $r_5$=−516.980 | | | | |
| | $a_5$=1.5059 | 1.6942 | 30.95 | |
| $r_6$=20.313 | | | | −3.417 |
| | $a_6$=12.3787 | | | |
| $r_7$=55.572 | | | | |
| | $a_7$=3.0117 | 1.5854 | 41.80 | |
| $r_8$=−96.291 | | | | |
| | $s'$=70.2337 | | | | wherein $s'$ is the back focal distance, $r_1$–$r_8$ are the radii of the surfaces, $a_1$–$a_7$ are the axial thicknesses and $\phi_{ii}$ indicates the refractive power of several lens surfaces.

16. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $$1.5 \leq \phi_{11} \leq 2.0$$
$$1.4 \leq \phi_{21} \leq 2.4$$
$$-2.0 \leq \phi_{22} \leq -1.0$$
$$-3.7 \leq \phi_{32} \leq -2.5$$

wherein $\phi$ denotes the refractive power and the index associated with $\phi$ indicates in its first digit the number of the lens in the direction of light travel and its second digit refers to the lens surface also in the direction of light travel, the objective having substantially the following data:

| relative aperture | $f$:4.0 | | | |
|---|---|---|---|---|
| field angle | 6° | | | |
| | | $n_e$ | $v_e$ | $\phi_{ii}$ |
| $r_1$=30.050 | | | | 1.726 |
| | $a_1$=4.5022 | 1.5187 | 63.96 | |
| $r_2$=363.927 | | | | |
| | $a_2$=0.1000 | | | |
| $r_3$=30.452 | | | | 1.703 |
| | $a_3$=10.3508 | 1.5187 | 63.96 | |
| $r_4$=31.892 | | | | −1.626 |
| | $a_4$=2.0010 | | | |
| $r_5$=−141.468 | | | | |
| | $a_5$=1.3744 | 1.6942 | 30.95 | |
| $r_6$=24.043 | | | | −2.887 |
| | $a_6$=10.1405 | | | |
| $r_7$=68.038 | | | | |
| | $a_7$=3.0015 | 1.5854 | 41.80 | |
| $r_8$=−61.405 | | | | |
| | $s'$=69.5493 | | | | wherein $s'$ is the back focal distance, $r_1$–$r_8$ are the radii of the surfaces, $a_1$–$a_7$ are the axial thicknesses and $\phi_{ii}$ indicates the refractive power of several lens surfaces.

17. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $$1.5 \leq \phi_{11} \leq 2.0$$
$$1.4 \leq \phi_{21} \leq 2.4$$
$$-2.0 \leq \phi_{22} \leq -1.0$$
$$-3.7 \leq \phi_{32} \leq -2.5$$

wherein $\phi$ denotes the refractive power and the index associated with $\phi$ indicates in its first digit the number of the lens in the direction of light travel and its second digit refers to the lens surface also in the direction of light travel, the objective having substantially the following data:

| | | $n_e$ | $v_e$ | $\phi_{11}$ |
|---|---|---|---|---|
| relative aperture | f:2.5 | | | |
| field angle | 27° | | | |
| $r_1=42.003$ | | | | |
| | $a_1=6.9191$ | 1.6808 | 54.93 | 1.620 |
| $r_2=555.241$ | | | | |
| | $a_2=0.1111$ | | | |
| $r_3=41.393$ | | | | 1.549 |
| | $a_3=13.1941$ | 1.6413 | 55.15 | |
| $r_4=53.898$ | | | | −1.190 |
| | $a_4=2.2212$ | | | |
| $r_5=−518.724$ | | | | |
| | $a_5=1.9658$ | 1.7617 | 27.37 | |
| $r_6=27.059$ | | | | −2.815 |
| | $a_6=23.4466$ | | | |
| $r_7=101.535$ | | | | |
| | $a_7=5.7641$ | 1.6734 | 46.82 | |
| $r_8=−101.535$ | s'=55.9258 | | | | wherein s' is the back focal distance, $r_1-r_8$ are the radii of the surfaces, $a_1-a_7$ are the axial thicknesses and $\phi_{11}$ indicates the refractive power of several lens surfaces.

18. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ wherein $\phi$ denotes the refractive power and the index associated with $\phi$ indicates in its first digit the number of the lens in the direction of light travel and its second digit refers to the lens surface also in the direction of light travel, the objective having substantially the following data:

| | | $n_e$ | $v_e$ | $\phi_{11}$ |
|---|---|---|---|---|
| relative aperture | f:2.5 | | | |
| field angle | 20.5° | | | |
| $r_1=35.9214$ | | | | 1.785 |
| | $a_1=7.0802$ | 1.6413 | 55.2 | |
| $r_2=381.6318$ | | | | |
| | $a_2=0.0833$ | | | |
| $r_3=30.8445$ | | | | 2.183 |
| | $a_3=8.3296$ | 1.6734 | 46.8 | |
| $r_4=59.1201$ | | | | −1.139 |
| | $a_4=2.3168$ | | | |
| $r_5=229.2469$ | | | | |
| | $a_5=2.0824$ | 1.7471 | 27.4 | |
| $r_6=20.3292$ | | | | −3.678 |
| | $a_6=37.2798$ | | | |
| $r_7=62.8734$ | | | | |
| | $a_7=7.4966$ | 1.7044 | 29.8 | |
| $r_8=226.7839$ | s'=36.1438 | | | | wherein s' is the back focal distance, $r_1-r_8$ are the radii of the surfaces, $a_1-a_7$ are the axial thicknesses and $\phi_{11}$ indicates the refractive power of several lens surface.

19. Four component objective for picture taking and projection comprising four lenses of which the front refracting surfaces of the first, second, and fourth lens are convex and wherein the front surfaces of the first $\phi_{11}$ and second $\phi_{21}$ lens and the rear surfaces of the second $\phi_{22}$ and third $\phi_{32}$ lens have refractive powers within the ranges given in the following Table- $1.5 \leq \phi_{11} \leq 2.0$
$1.4 \leq \phi_{21} \leq 2.4$
$-2.0 \leq \phi_{22} \leq -1.0$
$-3.7 \leq \phi_{32} \leq -2.5$ wherein $\phi$ denotes the refractive power and the index associated with $\phi$ indicates in its first digit the number of the lens in the direction of light travel and its second digit refers to the lens surface also in the direction of light travel, the objective having substantially the following data:

| | | $n_e$ | $v_e$ | $\phi_{11}$ |
|---|---|---|---|---|
| relative aperture | f:3.4 | | | |
| field angle | 12° | | | |
| $r_1=32.090$ | | | | 1.616 |
| | $a_1=4.5168$ | 1.5187 | 63.96 | |
| $r_2=229.126$ | | | | |
| | $a_2=0.1004$ | | | |
| $r_3=32.540$ | | | | 1.594 |
| | $a_3=12.5588$ | 1.5187 | 63.96 | |
| $r_4=34.542$ | | | | −1.501 |
| | $a_4=2.0075$ | | | |
| $r_5=−203.589$ | | | | |
| | $a_5=1.3789$ | 1.6942 | 30.95 | |
| $r_6=23.829$ | | | | −2.913 |
| | $a_6=12.6369$ | | | |
| $r_7=60.386$ | | | | |
| | $a_7=4.6484$ | 1.5919 | 48.36 | |
| $r_8=−65.945$ | s'=70.5338 | | | | wherein s' is the back focal distance, $r_1-r_8$ are the radii of the surfaces, $a_1-a_7$ are the axial thicknesses and $\phi_{11}$ indicates the refractive power of several lens surfaces.

* * * * *